INVENTORS
L. D. ETHINGTON
S. C. KAO

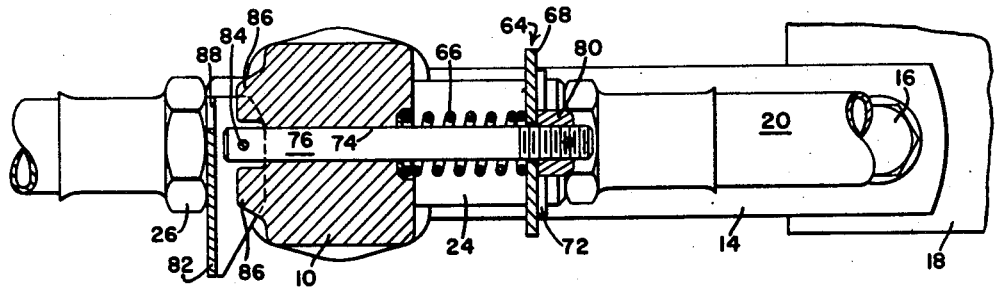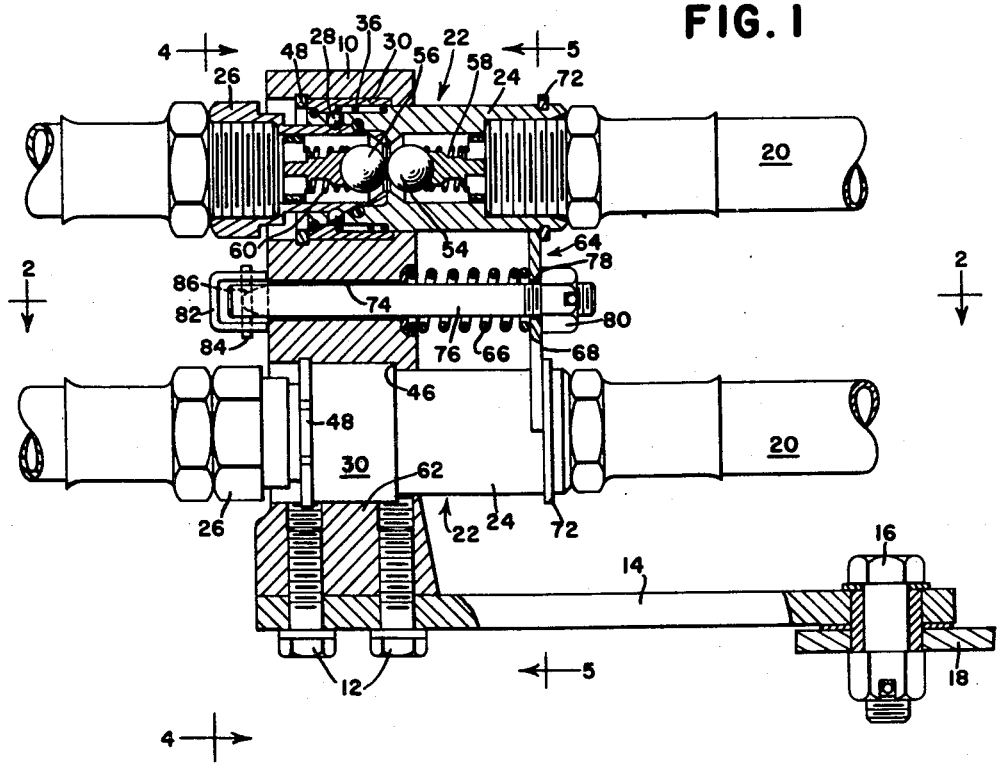

United States Patent Office 2,930,633
Patented Mar. 29, 1960

2,930,633

CONDUIT COUPLING CARRIER

Lloyd D. Ethington and Shih C. Kao, Cedar Falls, Iowa, assignors, by mesne assignments, to Deere & Company, a corporation of Delaware Application September 4, 1956, Serial No. 607,823

8 Claims. (Cl. 285—1)

This invention relates to a coupling carrier arrangement and more particularly to a carrier for supporting a pair of fluid couplings of the type commonly used between a valve box and a remotely located fluid motor.

A typical example of the field in which the present invention finds utility is the agricultural tractor-implement vehicle train in which the tractor has a hydraulic power lift system including a valve box from which one or more fluid-pressure-transmitting conduits extend to a motor in the form of a cylinder and piston located on the implement and useful for adjusting implement parts. The particular purpose of the provision of separable couplings between the valve box and the fluid motor is to enable other implements to be used with the tractor without requiring the dismounting of the motor from the first implement. Other advantages in the use of separable couplings flows from the fact that these couplings will separate under tensional force of a predetermined value in the event that the draft connection between the tractor and the implement fails.

The general environment in which the invention is capable of use is represented by the U.S. patent to Jirsa et al. 2,532,552, in which the couplings are deliberately separable by manual manipulation and are separable under excessive tensional forces by the destruction of frangible washers. In another type of coupling, such as that forming the subject matter of the U.S. patent to Olson 2,706,646, the coupling parts are normally locked against axial separation until the coupling is shifted axially relative to a lock control element in the form of a collar biased to locking position. Hence, the application of a tensional force of a predetermined value will overcome the biasing means and cause the coupling to shift relative to the collar, thereby releasing a detent or other form of lock so that the couplings can separate axially.

In either form of coupling, such as indicated above, or in other forms that are equivalent thereof, experience has shown that forces sufficient to overcome the coupling releasable lock can sometimes be developed by the sheer weight of the hose lines, particularly in those cases in which hose lines are relatively long. This problem could, of course, be simply overcome by increasing the effectiveness of the coupling lock, but then the couplings would be unsuitable for use in situations in which the initial forces are of smaller magnitude. According to the present invention, the problem is solved expeditiously and at the same time in a manner retaining the original characteristics of the coupling by the provision of a novel carrier which mounts one or more couplings and includes means embodied in the carrier for adding to the force required to overcome the resistance of the coupling or couplings to separation. The added biasing means thus prevents separation of the couplings merely by the weight of extremely long hose lines. Another feature of the invention is the inclusion in the carrier of means for retracting the additional load-applying means so as to remove the load thereof for facilitating manual disconnection of the couplings. The invention features a carrier that may be suitably used for one or more couplings. Another object of the invention is to provide a coupling carrier that may adapt itself to couplings of existing types with little or no modification of the couplings. It is a still further object of the invention to provide the added load-applying means in such manner that it acts individually against any one of a plurality of couplings.

The foregoing and other important objects and desirable features inherent in and encompassed by the invention will become apparent as a preferred embodiment thereof is disclosed in detail in the ensuing description and accompanying sheets of drawings, the several figures of which are described immediately below.

Fig. 1 is a sectional view, partly in elevation, showing a preferred embodiment of the carrier and the manner in which it mounts a pair of identical couplings.

Fig. 2 is a sectional view as seen on the line 2—2 of Fig. 1.

Figure 3:
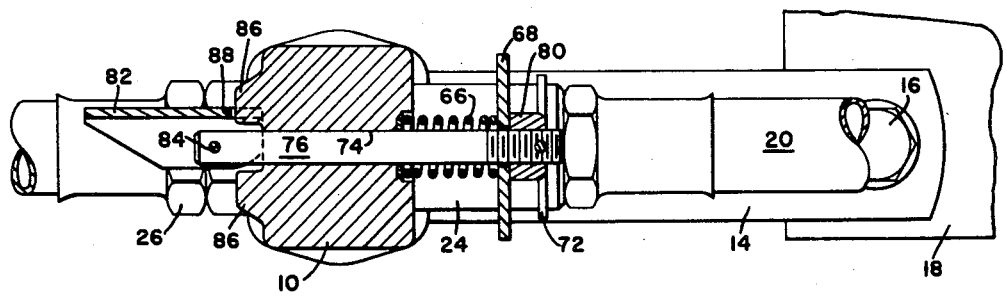
Fig. 3 is a sectional view similar to Fig. 2 but showing the additional biasing or yielding means in its retracted position.
Figure 4:
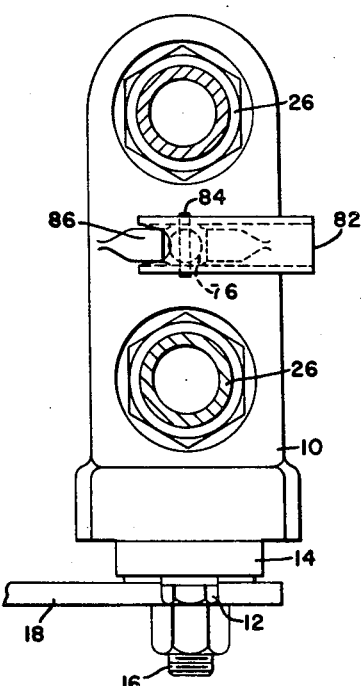
Fig. 4 is a section as seen along the line 4—4 on Fig. 1.

Familiarity with the basic tractor-implement organization will be assumed. The improved carrier comprises a carrier body 10 removably connected, as by cap screws 12, to an intermediate support 14 which is in turn pivotally connected at 16 to a suitable part 18 of the tractor (not shown). The pivotal mounting of the intermediate support 14 on the tractor part 18 enables lateral swinging of the carrier and thus accommodates flexing of a pair of fluid-pressure-transmitting conduits 20 as the tractor negotiates turns.

Figure 6:
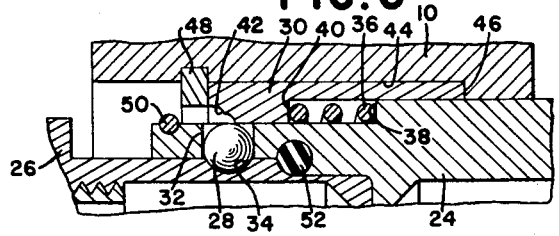
Fig. 6 is an enlarged fragmentary sectional view showing the coupling parts just prior to release thereof for axial separation.

Each conduit includes a separable coupling 22 of the type including front and rear coupling parts 24 and 26, respectively, coaxially interconnected by lock means including detent balls 28 and a control element or collar 30 that surrounds the coupling and normally retains the balls 28 in ball-receiving bores 32 in the front coupling part 24 and ball-receiving notches 34 (which may be a single annular groove) in the rear coupling part 26. Biasing means in the form of a coil spring 36 encircles the front coupling part 24 and acts between a coupling part shoulder 38 and a shoulder 40 on the collar 30 (Fig. 6) to urge the collar to its lock position (Fig. 1). That is to say, when the coupling is in its Fig. 1 position, the spring 36 urges the coupling assembly 22 axially forwardly so that the collar confines the balls 28 to the ball-receiving pockets 34 in the rear coupling part 26. From this it will be seen that if the collar 30 is held and the entire coupling assembly is displaced rearwardly or to the left as viewed in the drawings, the spring 36 will be compressed between the two shoulders 38 and 40 and ultimately the balls 28 will be exposed to an annular relief groove 42 (Fig. 6) at the rear of the collar, into which the balls may escape upon continued rearward movement of the coupling, whereupon the rear coupling part 26 will separate from the front coupling part 24. The balls will be retained by the pockets or bores 32 until the couplings are reconnected. Obviously, the spring 36, when the coupling is relieved of the axial pull-apart force, will return the front coupling part 24 forwardly.

Confinement of the collar 30 to the carrier body 10 is accomplished by the provision in that body of a collar-receiving bore 44, which bore has a front shoulder 46 against which the front of the collar abuts. A snap ring 48 operates between the interior of the bore 44 and the rear of the collar 30. A rear snap ring 50 is carried by the front coupling part 24 and limits forward movement of that coupling part by the collar-control spring 36. An annular seal 52 appropriately seals the coupling parts when they are interconnected.

As illustrated, the coupling is of the valved or self-sealing type, the coupling parts respectively having ball check valves 54 and 56 which are spring loaded at 58 and 60 to seal the respective parts when the parts are axially separated. These details form no part of the present invention and elaboration thereof is adequately covered in the above-identified Olson patent.

The other coupling 22 is identical to that just described and it is mounted in the carrier 10 by a second bore 62 identical to the bore 44. Another snap ring 48 retains the collar 30 of the other coupling.

From the description thus far, it will be appreciated that the forward portions of the hoses 20 are connected to a tractor-mounted valve box and the rear portions of the hoses are connected to a fluid motor on the trailing implement. Since the collars 30 are retained in the carrier 10 by the snap rings 48, it will be seen that a tensional or axially directed pull-apart force applied to the rear section of either hose or conduit 20 will tend to displace its entire coupling rearwardly against the bias or load of the respective collar control spring 36. When the amount of movement resulting from the application of tensional force is sufficient to permit the detent or lock balls 28 to escape into the annual relief groove 42 of the collar 30, then the rear coupling part 26 will separate from its companion front coupling part. Upon separation, the respective ball checks 54 and 56 will seal the coupling parts against the loss of fluid. The separated couplings may be manually reconnected by grasping the front coupling part and shifting it rearwardly in the same amount that it was shifted rearwardly by the pull-apart force, whereupon the rear coupling part may be inserted and the two coupling parts released for bodily forward movement of the coupling to establish the reconnection or releasable lock at 28—34. Manual release of the coupling parts may be accomplished by the application of a manual rearward force to the entire coupling assembly in the same manner as that described above. Hence, the coupling may be released either manually or in response to an extraneous tensional or pull-apart force.

In normal usage and application of the couplings to typical installations, the biasing force set up by the collar control spring 36 is adequate, but in many instances, particularly where the hose lines become extremely long, the sheer weight of the hose or hoses is sufficient to substantially overcome the force of the collar control spring, with the result that slight additional forces cause the coupling to separate in circumstances in which separation is not required or desired. As already indicated, stronger collar control springs would alleviate that problem but would present new problems in that the same couplings could not be used in situations in which initial forces are lighter.

According to the present invention, the problem is solved by the provision of additional biasing or yielding means, designated in its entirety by the numeral 64, which means is effective to add to the force required to overcome the collar control spring or springs 36 an additional obstacle in the form of a stronger coil spring 66 which acts between the front side of the carrier body 10 and a collar-engaging member or plate 68.

Figure 5:
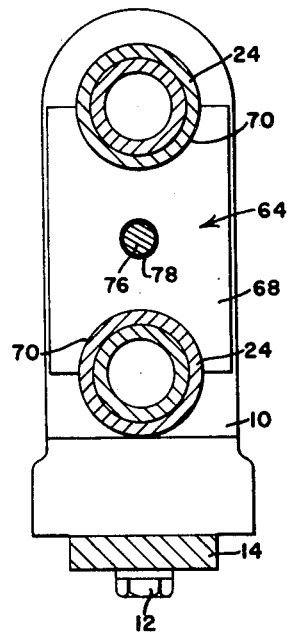
Fig. 5 is a section as seen along the line 5—5 on Fig. 1.

As best shown in Fig. 5, the plate 68 has opposite notched edge portions 70 which respectively embrace or receive the front coupling parts 24. These notched edges cooperate with abutment means in the form of snap rings 72 that respectively encircle the front coupling parts 24. The provision of grooves to receive the snap rings is the only modification required of conventional couplings.

Each snap ring 72 and the proximate portion of the collar-engaging plate 68 affords one-way means or a one-way connection between the coupling and the plate by means of which rearward movement of the coupling 22, or movement in its axial release direction, is opposed by the plate, but the plate 68 may be moved rearwardly without incurring rearward movement of the coupling or couplings. The plate is normally biased forwardly by the coil compression spring 66 which, as stated above, acts between one side of the plate and the proximate side of the carrier 10. The carrier body has an opening 74 therethrough which is parallel to the axes of the parallel couplings 22 and which loosely receives a rod 76. This rod passes coaxially through the coil spring 66 and through a coaxial aperture 78 in the plate 68 and is headed by the provision of a threaded nut 80 thereon.

The rearward or opposite end of the rod 76 is controlled by a bi-positional cam 82, which is pivotally connected to the rear end of the rod 76 by a pin 84 for pivotal movement between the position of Fig. 2 and the position of Fig. 3. The cam means 82, as best seen in Fig. 1, is of U-shaped cross section and embraces a pair of lugs 86 preferably cast integrally with the rear face of the carrier 10. Hence, in either position of the cam, the rod 76 is prevented from turning. As best shown in Figs. 2 and 3, one end of the cam is notched at 88 to accommodate the proximate lug 86 when the cam is turned to the position of Fig. 3.

In normal operation of the equipment in which the coupling carrier is utilized, the cam 82 will occupy the position of Fig. 2, thereby enabling the coupling-engaging plate spring 66 to engage the plate with a biasing force of greatest magnitude, which force is thereby added to the force of the collar control springs 36. Hence, the tensional pull-apart force required to shift the couplings 22 rearwardly to effect axial separation thereof is considerably higher than that that would be required were the means 64 omitted. In other words, tensional forces applied to the rear sections of the hoses 20 must overcome not only the collar control springs 36 but also the spring 66. In view of the one-way connections established at 70—72, the couplings 22 may shift rearwardly individually, which also points up the adaptability of the carrier to mount a single coupling rather than a pair. The illustration will also serve to demonstrate that couplings in sets of three or more could be mounted in a carrier based on the design of the carrier 10.

The increased force resulting from the use of the means 64 when the spring 66 is operative to extend or force the plate 68 forwardly is too great to be overcome manually. However, the obstacle to manual release of the couplings is overcome by the provision of the cam 82. This cam, when moved to the position of Fig. 3, retracts the plate 68 against the spring 66 and thus removes the effectiveness of the means 64 in opposition to rearward shifting of the couplings 22, whereupon the only force required to separate the couplings is that developed by the coupling control springs 36. The cam 82 retains its Fig. 3 position so that the means 64 is retracted during manual reconnection of the couplings.

In the event that the carrier and couplings are used in an installation in which the additional force imposed by the spring 66 is not required, the cam 82 may retain its Fig. 3 position.

The carrier is of simple construction and, as already indicated, the application of the means 64 thereto requires only slight modification of couplings of existing designs. Couplings of a nature other than those illustrated may, of course, be employed in the carrier having the same basic features. Other features of the invention not categorically enumerated will occur to those versed in the art, as will many modifications and alterations in the specific form disclosed, all of which may be achieved without departure from the spirit and scope of the invention.

What is claimed is:

1. In a coupling and coupling carrier arrangement including: a carrier having means for the fixed mounting thereof on a tractor; a coupling having a pair of axially separable and reconnectible parts, said coupling being mounted on the carrier for axial movement bodily relative to the fixed carrier to shift out of a normal position to a shifted position in response to an axial coupling-separating force applied tensionally to one of the coupling parts in a direction away from the tractor and carrier, said coupling including releasable lock means engaged between the coupling parts to hold said parts connected in the normal position of the coupling and automatically releasable when the coupling moves to its shifted position whereby the part to which said force is applied is pulled away from the other coupling part, said carrier and said other coupling part being constructed so that upon separation of said parts said other part remains with the carrier; first coupling-biasing means acting between the carrier and coupling to yieldably retain the normal position of the coupling and hence to incur engagement of the lock means against axial forces applied tensionally to said one coupling part at values below that of said first biasing means; additional biasing means acting between the coupling and carrier for imposing an additional biasing force on the coupling in the direction of its normal position so as to yieldably retain the normal position of the coupling against coupling-separating forces applied tensionally to said one coupling part at values up to the combined values of both biasing means; means for adjusting the second biasing means; and means for selectively effectuating and negativing said second biasing means.

2. The invention defined in claim 1, in which: the first biasing means includes a coil spring coaxial with the coupling; and the additional biasing means includes a spring offset from the coupling axis.

3. The invention defined in claim 1 in which: the additional biasing means includes a member carried by the carrier for movement in opposite directions, a spring biasing said member in one direction and enabling movement of said member in the opposite direction, and one-way engaging means between the coupling and member for transmitting spring-biased movement of the member to the coupling in said one direction; and the selective means includes an element for retracting the member in said opposite direction and against said spring to disable said one-way engaging means.

4. The invention defined in claim 3 in which: the spring is a coil spring having its axis parallel to the coupling axis; the carrier has an opening therein coaxial with the spring; and the selective means element includes a rod passed loosely through said coil spring and opening and member and having at one end a head engaging said member and having at its other end bi-positionable cam means operative in one position to retract the rod and member against the coil spring and operative in its other position to enable extension of said member via said coil spring.

5. The invention defined in claim 1 including: a further coupling like the first-mentioned coupling and similarly carried by the carrier in parallelism with said first-mentioned coupling and including a coupling-biasing means like said first mentioned biasing means; and means in said additional biasing means enabling said additional biasing means to impose its additional biasing force on both couplings.

6. The invention defined in claim 5 in which: the additional biasing means includes a member carried by the carrier for movement in opposite directions, a spring biasing said member in one direction and enabling movement of said member in the opposite direction, and one-way engaging means between the couplings and member for transmitting spring-biased movement of the member to the couplings in said one direction; and the selective means includes an element for retracting the member in said opposite direction and against said spring to disable said one-way engaging means.

7. The invention defined in claim 6, in which: the spring is a coil spring having its axial parallel to the axes of the couplings; the carrier has an opening therein coaxial with the spring; and the selective means element includes a rod passed loosely through said coil spring and opening and member and having at one end a head engaging said member and having at its other end bi-positionable cam means operative in one position to retract the rod and member against the coil spring and operative in its other position to enable extension of said member via said coil spring.

8. The invention defined in claim 5, in which the coupling-engaging member comprises a plate having opposite notched edge portions respectively receiving the couplings.

References Cited in the file of this patent

UNITED STATES PATENTS

| | | |
|---|---|---|
| 1,784,821 | Crowley | Dec. 16, 1930 |
| 2,159,150 | Heinty | May 23, 1939 |
| 2,514,717 | Power | July 11, 1950 |
| 2,538,259 | Merriman | Jan. 16, 1951 |
| 2,548,528 | Hansen | Apr. 10, 1951 |
| 2,699,961 | Omon et al. | Jan. 18, 1955 |
| 2,788,991 | Neuhauser | Apr. 16, 1957 |